(12) United States Patent
Kunt et al.

(10) Patent No.: US 10,674,528 B2
(45) Date of Patent: Jun. 2, 2020

(54) METHOD AND APPARATUS FOR TRANSMISSION WITHOUT DYNAMIC SCHEDULING IN MOBILE COMMUNICATIONS

(71) Applicant: MediaTek Singapore Pte. Ltd., Singapore (SG)

(72) Inventors: Mehmet Kunt, Cambridge (GB); Pavan Santhana Krishna Nuggehalli, San Jose, CA (US); Pradeep Jose, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 15 days.

(21) Appl. No.: 16/008,172

(22) Filed: Jun. 14, 2018

(65) Prior Publication Data

US 2018/0368160 A1 Dec. 20, 2018

Related U.S. Application Data

(60) Provisional application No. 62/519,916, filed on Jun. 15, 2017, provisional application No. 62/542,879, filed on Aug. 9, 2017, provisional application No. 62/566,807, filed on Oct. 2, 2017.

(51) Int. Cl.
*H04W 72/12* (2009.01)
*H04W 72/14* (2009.01)

(52) U.S. Cl.
CPC ....... *H04W 72/1268* (2013.01); *H04W 72/14* (2013.01); *H04W 72/1242* (2013.01)

(58) Field of Classification Search
CPC .............. H04W 28/065; H04W 72/14; H04W 72/1268; H04L 1/1812
See application file for complete search history.

(56) References Cited

U.S. PATENT DOCUMENTS 7,948,936 B2 * 5/2011 Lohr ................ H04L 47/10
370/329
2006/0268938 A1 11/2006 Terry
2007/0121542 A1 5/2007 Lohr et al.
2012/0275381 A1 11/2012 Kim et al.
2016/0270109 A1 9/2016 Jiang et al.

FOREIGN PATENT DOCUMENTS

CN 106788943 A 5/2017
WO WO 2017041685 A1 3/2017
WO WO 2017059829 A2 4/2017

OTHER PUBLICATIONS

Taiwan Intellectual Property Office, Office Action for Taiwan Patent Application No. 107120767, dated Apr. 19, 2019.
United States Patent and Trademark Office, International Search Report and Written Opinion for International Patent Application No. PCT/US2018/037695, dated Sep. 4, 2018.

* cited by examiner

*Primary Examiner* — Chandrahas B Patel
(74) *Attorney, Agent, or Firm* — Han IP PLLC; Andy M. Han

(57) ABSTRACT

Various solutions for transmission without dynamic scheduling with respect to user equipment and network apparatus in mobile communications are described. An apparatus may receive a configured grant. The apparatus may select an allowed logical channel to use the configured grant. The apparatus may schedule uplink data from the allowed logical channel to a protocol data unit (PDU). The apparatus may transmit the PDU on the configured grant.

20 Claims, 5 Drawing Sheets

| | | |
|---|---|---|
| 300 | PERMITTED LC SDU | PADDING |

| | | |
|---|---|---|
| 301 | PERMITTED LC SDU | PADDING BSR |

| | | |
|---|---|---|
| 302 | REGULAR BSR | PADDING |

| | | | |
|---|---|---|---|
| 303 | PERMITTED LC SDU | RESTRICTED LC SDU | PADDING |

| | | | |
|---|---|---|---|
| 304 | RESTRICTED LC SDU | REGULAR BSR | PADDING |

| | | |
|---|---|---|
| 305 | RESTRICTED LC SDU | PADDING BSR |

| | | |
|---|---|---|
| 306 | PADDING BSR | PADDING |

FIG. 3

METHOD AND APPARATUS FOR TRANSMISSION WITHOUT DYNAMIC SCHEDULING IN MOBILE COMMUNICATIONS

CROSS REFERENCE TO RELATED PATENT APPLICATION(S)

The present disclosure claims the priority benefit of U.S. Provisional Patent Application Ser. Nos. 62/519,916, 62/542,879 and 62/566,807, filed 15 Jun. 2017, 9 Aug. 2017 and 2 Oct. 2017, respectively, contents of which are herein incorporated by reference in their entirety.

TECHNICAL FIELD

The present disclosure is generally related to mobile communications and, more particularly, to transmission without dynamic scheduling with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), uplink grant-free transmission using configured grants or transmission without dynamic scheduling is proposed to reduce the latency of ultra-reliable and low latency communications (URLLC) services. A user equipment (UE) may be configured to transmit its uplink data on some radio resources without requiring a prior request (e.g., scheduling request (SR), random-access channel (RACH) request or buffer status report (BSR)) to improve its transmission latency. In the transmission and reception without dynamic scheduling, the network apparatus may pre-configure specific radio resources (e.g., time and frequency resources) for the UE to perform the transmission. These specific radio resources may be potentially shared by a plurality of UEs. Consequently, collisions or conflicts of the transmissions may happen among the plurality of UEs.

Accordingly, one important performance target for the contention based grant-free transmission may be lowering the collision rate. As more UEs try to transmit uplink data simultaneously on contention based grants, the probability of collisions may be increased. The transmission reliability and latency may also be degraded. Therefore, in order to meet the service requirements targeted by the contention based grant-free transmissions, it is needed to minimize the collisions.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to transmission without dynamic scheduling with respect to user equipment and network apparatus in mobile communications.

In one aspect, a method may involve an apparatus receiving a configured grant. The method may also involve the apparatus selecting an allowed logical channel to use the uplink grant. The method may further involve the apparatus scheduling uplink data from the allowed logical channel to a protocol data unit (PDU). The method may further involve the apparatus transmitting the PDU on the configured grant.

In one aspect, an apparatus may comprise a transceiver capable of wirelessly communicating with a plurality of nodes of a wireless network. The apparatus may also comprise a processor communicatively coupled to the transceiver. The processor may be capable of receiving a configured grant. The processor may also be capable of selecting an allowed logical channel to use the configured grant. The processor may further be capable of scheduling uplink data from the allowed logical channel to a PDU. The processor may further be capable of transmitting, via the transceiver, the PDU on the configured grant.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 3 is a diagram depicting example MAC PDUs under schemes in accordance with implementations of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to transmission without dynamic scheduling with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, uplink grant-free transmission using configured grants or transmission without dynamic scheduling is proposed to reduce the latency of URLLC services. A UE may be configured to transit its uplink data on some radio resources without requiring a prior request (e.g., SR, RACH request or BSR) to improve the transmission latency. In the transmission and reception without dynamic scheduling, the network apparatus may pre-configure specific radio resources (e.g., time and frequency resources) for the UE to perform the transmission. These specific radio resources may be potentially shared by a plurality of UEs. Consequently, collisions or conflicts of the transmissions may happen among the plurality of UEs. Accordingly, one important performance target for the contention based grant-free transmission may be lowering the collision rate. As more UEs try to transmit uplink data simultaneously on the contention based grants, the probability of collisions may be increased. The transmission reliability and latency may also be degraded. Therefore, in order to meet the service requirements targeted by the contention based grant-free transmissions, it is needed to minimize the collisions.

Figure 1:
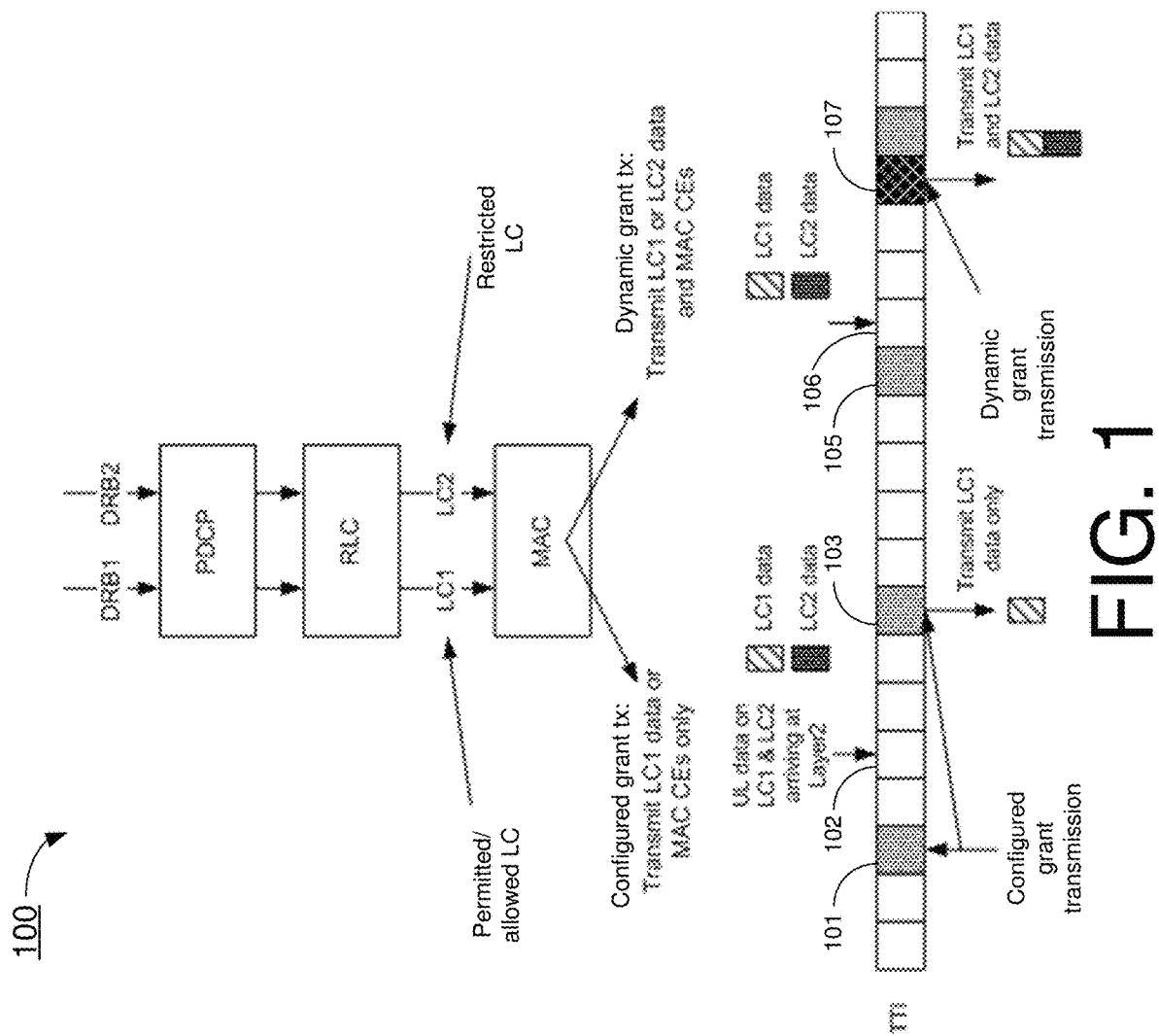
FIG. 1 is a diagram depicting an example scenario under schemes in accordance with implementations of the present disclosure.

FIG. 1 illustrates an example scenario 100 under schemes in accordance with implementations of the present disclosure. Scenario 100 involves a UE and a network apparatus, which may be a part of a wireless communication network (e.g., an LTE network, an LTE-Advanced network, an LTE-Advanced Pro network, a 5G network, an NR network, an IoT network or an NB-IoT network). The UE may comprise a plurality of protocol layers such as, for example and without limitation, a radio resource control (RRC) layer, a packet data convergence protocol (PDCP) layer, a radio link control (RLC) layer, a medium access control (MAC) and a physical (PHY) layer. The PDCP layer may comprise a PDCP entity to receive data from the upper layer (e.g., RRC layer or the application layer) via the data radio bearers (DRBs) (e.g., DRB 1 and DRB 2). The RLC layer may comprise a RLC entity to receive data from the PDCP layer and transmit data to the MAC layer via logical channels (LCs) (e.g., LC 1 and LC 2). The MAC layer may comprise a MAC entity to schedule/multiplex data and transmit MAC PDUs to the physical layer.

The network apparatus may be configured to transmit an uplink grant to the UE. The uplink grant may indicate uplink resources configured for the UE to perform uplink transmissions. The uplink grant may comprise the information such as, for example and without limitation, time and frequency allocations, sub-carrier spacing (SCS), transmission time interval (TTI) durations, modulation and coding scheme (MCS) or other numerologies/profiles. The uplink grant may comprise the configured grant of grant-free based transmission and the dynamic grant of dynamic grant based transmission. The dynamic grant of dynamic grant based transmission is configured by the network apparatus per UE's request. The UE may have to transmit a request (e.g., SR, RACH request or BSR) to the network apparatus first. The network may configure a dynamic grant in response to the request. The configured grant of grant-free based transmission is pre-configured by the network apparatus without requiring a prior request. The network apparatus may pre-configure a configured grant to the UE for the transmission without dynamic scheduling. The UE may directly use the configured grant to transmit uplink data without request.

The UE may receive the configured grant via RRC signaling or layer 1 (L1) signaling. For example, the configured grant may comprise a first configured grant type (e.g., a configured grant type 1) which is provided by the RRC signaling. The configured grant may also comprise a second configured grant type (e.g., a configured grant type 2) which is provided by physical downlink control channel (PDCCH) signaling and may be activated or deactivated by L1 signaling indications.

The UE may be configured to classify data according to service requirements or characteristics of the data. Some data with a low latency quality of service (QoS) target may be classified as the critical data. The critical data may comprise, for example and without limitation, URLLC data which may include commands, responses or indications used for control purposes in the application layer. Some data which is not reliant on real-time transmission may be classified as the non-critical data. The non-critical data may comprise, for example and without limitation, enhanced mobile broadband (eMBB) data which may include background information such as statistics, video feed or periodic diagnostic data.

As the requirements may be the same for the data transmitted on a single logical channel, the UE may be configured to differentiate the data with different characteristics such as latency requirements or QoS requirements with the use of different logical channels. For example, the critical data may be distributed to an allowed logical channel or a permitted logical channel (e.g., LC1). The data in the allowed logical channel or the permitted logical channel may be allowed to be transmitted via the configured grant. The non-critical data may be distributed to a restricted logical channel (e.g., LC2). The data in the restricted logical channel may be not allowed to be transmitted via the configured grant and may only be transmitted via the dynamic grant. Accordingly, having separate logical channel restrictions for the configured grant may provide more flexibility for controlling traffic amount on the grant-free radio resources. In some implementations, separate restrictions may also be applied based on QoS flow. The UE may be configured to differentiate the data with different characteristics by different QoS flow.

The logical channel restrictions may be configured by the network apparatus via RRC signaling. Specifically, the network apparatus may configure a logical channel restriction rule for each logical channel of the UE. For example, the network apparatus may configure an allowed indication (e.g., lcp-configuredGrantType1Allowed) for a logical channel to indicate whether a logical channel is allowed to use the configured grant. In a case that the indication is set to be true, the logical channel is allowed to be selected for the configured grant. In a case that the indication is set to be false, the logical channel is not allowed to be selected for the configured grant. The allowed indication may be configured in RRC signaling. The UE may be configured to determine an allowed logical channel according to the logical channel restriction rule. The UE may select a logical channel which an allowed indication is configured for the configured grant.

As shown in FIG. 1, a first logical channel is configured as a permitted or allowed logical channel (e.g., LC1) and a second logical channel is configured as a restricted logical channel (e.g., LC2). The permitted logical channel may be configured to transmit the URLLC data. The restricted logical channel may be configured to transmit the eMBB data. The UE may receive the configured grant and its configuration from the network apparatus. The configured grant transmission may be configured at TTI 101, 103 and 105. The MAC entity may receive the uplink data from the permitted logical channel (e.g., LC1 data) and the uplink data from the restricted logical channel (e.g., LC2 data) at TTI 102. Since only the permitted logical channel is allowed for the configured grant, the MAC entity may schedule the uplink data from the permitted logical channel to a first MAC PDU. The UE may be configured to transmit the first MAC PDU on the configured grant transmission at TTI 103. In this example, the restricted logical channel is not allowed to be selected for the configured grant. The UE may pend or buffer the data from the restricted logical channel until receiving the dynamic grant.

The UE may further receive the dynamic grant of dynamic grant based transmission from the network apparatus. The dynamic grant transmission may be configured at TTI 107. The MAC entity may receive the uplink data from the permitted logical channel (e.g., LC1 data) and the uplink data from the restricted logical channel (e.g., LC2 data) at TTI 106. Since both the permitted logical channel and the restricted logical channel can be transmitted via dynamic grant transmission, the MAC entity may schedule the uplink data from the permitted logical channel and the uplink data from the restricted logical channel to a second MAC PDU. The UE may be configured to transmit the second MAC PDU on the dynamic grant transmission configured at TTI 107.

Accordingly, FIG. 1 illustrates an exclusive transmission for the permitted/allowed logical channel. Only the data on the permitted/allowed logical channel may trigger the UE to perform uplink transmission on the configured grant transmission. Besides, the UE may not preclude transmitting the data from the permitted/allowed logical channel on the dynamic grant. The permitted/allowed logical channel may have higher priority than other logical channels to make sure that the permitted/allowed logical channel may be served before other logical channels in a logical channel prioritization (LCP) procedure.

In some implementations, the permitted/allowed logical channels may be a subset of logical channels. The network apparatus may optionally configure a subset of logical channels that trigger the UE to perform uplink transmission on the configured grant transmission by RRC signaling. The network apparatus may configure the subset of logical channels based on the corresponding service requirements (e.g., latency requirement).

In some implementations, multiple logical channels may be configured as the permitted/allowed logical channels. The UE may select a set of permitted/allowed logical channels to use the configured grants. The MAC entity may schedule the uplink data from the multiple permitted/allowed logical channels to a MAC PDU. The MAC PDU may comprise the data from the multiple permitted/allowed logical channels. The UE may be configured to transmit the MAC PDU on the configured grants.

In some implementations, a logical channel may be configured as a permitted/allowed logical channel for all the configured grants. Alternatively, a logical channel also may be configured as a permitted/allowed logical channel for a subset of the configured grants. For example, a plurality of different configured grants (e.g., CG 1 and CG 2) may be configured to the UE. The plurality of the configured grants may comprise different resource configurations and/or different periodicities. A first permitted/allowed logical channel (e.g., LC1) may be permitted/allowed for all the configured grants (e.g., CG 1 and CG 2). A second permitted/allowed logical channel (e.g., LC2) may be permitted/allowed for a subset of the configured grants (e.g., only CG 2). The second permitted/allowed logical channel may have different restrictions than the first permitted/allowed logical channel.

In some implementations, logical channel restrictions may be configured based on the type of the configured grant. For example, a logical channel may be permitted/allowed for all the configured grants of the second configured grant type (e.g., a configured grant type 2), but may not be permitted/allowed for the configured grants of the first configured grant type (e.g., a configured grant type 1). Different types of the configured grant may be configured on different logical channels.

Figure 2:
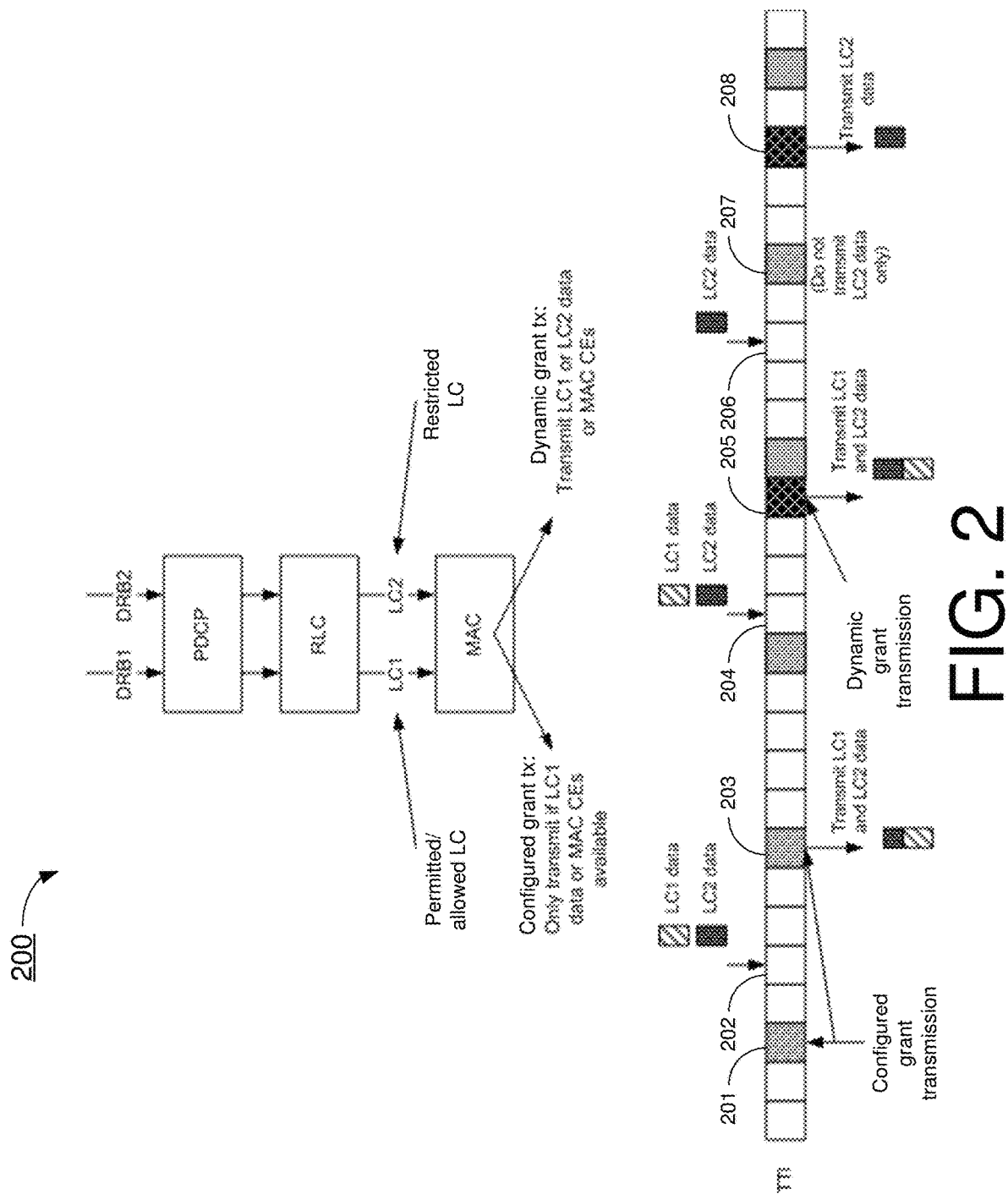
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network apparatus, which may be a part of a wireless communication network (e.g., an LTE network, an LTE-Advanced network, an LTE-Advanced Pro network, a 5G network, an NR network, an IoT network or an NB-IoT network). Similarly, a first logical channel is configured as a permitted/allowed logical channel (e.g., LC1) and a second logical channel is configured as a restricted logical channel (e.g., LC2). The permitted/allowed logical channel may be configured to transmit the URLLC data. The restricted logical channel may be configured to transmit the eMBB data. The UE may receive the configured grant from the network apparatus. The configured grant transmission occasions may be configured at, for example, TTI 201, 203 and 207. The MAC entity may receive the uplink data from the permitted logical channel (e.g., LC1 data) and the uplink data from the restricted logical channel (e.g., LC2 data) at TTI 202. Since only the permitted logical channel is allowed to trigger the use of configured grant transmission, the MAC entity may schedule the uplink data from the permitted logical channel to a first MAC PDU. In this example, the first MAC PDU may still have remaining space for filling data. The MAC entity may further schedule the uplink data from the restricted logical channel to the first MAC PDU. The UE may be configured to transmit the first MAC PDU on the configured grant transmission occasion at TTI 203.

The UE may further receive the dynamic grant of dynamic grant based transmission from the network apparatus. The dynamic grant transmission may be configured at TTI 205. The MAC entity may receive the uplink data from the permitted logical channel (e.g., LC1 data) and the uplink data from the restricted logical channel (e.g., LC2 data) at TTI 204. Since both the permitted logical channel and the restricted logical channel can be transmitted via dynamic grant transmission, the MAC entity may schedule the uplink data from the permitted logical channel and the uplink data from the restricted logical channel to a second MAC PDU. The UE may be configured to transmit the second MAC PDU on the dynamic grant transmission configured at TTI 205.

The MAC entity may receive the uplink data from the restricted logical channel (e.g., LC2 data) at TTI 206. Since only the permitted logical channel is allowed to trigger the use of configured grant transmission, the uplink data from the restricted logical channel (e.g., LC2 data) may not trigger the transmission on the configured grant transmission occasion at TTI 207. The UE may not perform uplink transmission at TTI 207. The UE may be configure to transmit a request to acquire the dynamic grant of dynamic grant based transmission. The UE may then receive the dynamic grant of dynamic grant based transmission from the network apparatus. The dynamic grant transmission may be configured at TTI 208. The MAC entity may schedule the uplink data from the restricted logical channel to a third MAC PDU. The UE may be configured to transmit the third MAC PDU on the dynamic grant transmission configured at TTI 208.

Accordingly, FIG. 2 illustrates a non-exclusive transmission for the permitted/allowed logical channel. A MAC PDU may be transmitted on a configured grant only when the data from the permitted logical channel is present in the MAC PDU. In a case that a transmission on a configured grant is triggered and there is remaining grant/space after accommodating the data from the permitted logical channel, the data from the restricted logical channel may also be transmitted in the same MAC PDU. It may have benefits for spectral efficiency to accommodate the data from the restricted logical channel in the MAC PDU containing the data from the permitted logical channel.

In some implementations, the logical channel restriction rule may not be applied to the MAC control element (MAC CE). Specifically, the MAC CE may also have higher priority for transmission and may be transmitted on the configured grant. When one or more MAC CEs are presented in the MAC PDU, the MAC PDU may be transmitted on the configured grant. For example, in a case that a MAC PDU comprises the service data unit (SDU) from the permitted logical channel and/or the MAC CE, the MAC PDU may be transmitted on the configured grant. In a case that a MAC PDU comprises the MAC CE and the SDU from the restricted logical channel, the MAC PDU may also be transmitted on the configured grant.

In some implementations, in a case that the configuration for permitted logical channels is not received from the network apparatus, the UE may consider all logical channels to be permitted for using the configured grant. Alternatively, the UE may be configured to determine some logical channels as the permitted logical channels according to a previous configuration or a pre-determined rule.

FIG. 3 illustrates some example MAC PDUs under schemes in accordance with implementations of the present disclosure. MAC PDU 300, 301 and MAC PDU 302 illustrate the example MAC PDUs that may trigger the exclusive transmission on the configured grant for the permitted logical channel. In MAC PDU 300, only the SDU from the permitted logical channel may be transmitted. The SDU from the restricted LC is not allowed to be scheduled in MAC PDU 300. MAC PDU 300 may also comprise a padding. In MAC PDU 301, only the SDU from the permitted logical channel may be transmitted. The SDU from the restricted LC is not allowed to be scheduled in MAC PDU 301. MAC PDU 301 may also comprise a padding buffer status report (BSR). The padding BSR may be transmitted when the number of the padding bits is larger than the size of the BSR. The padding bit space may be used to transmit the BSR. In MAC PDU 302, a regular BSR may also be transmitted on the configured grant. The regular BSR may be transmitted when a new data arrives in the uplink buffer and the new data has higher priority than other data already waiting in the buffer. The configured grant may be used to transmit the regular BSR even when no SDU from the permitted LC is present.

MAC PDU 303 and MAC PDU 304 illustrate the example MAC PDUs that may trigger the non-exclusive transmission on the configured grant for the permitted logical channel. In MAC PDU 303, the SDU from the permitted LC is presented and the remaining space may be used to transmit the SDU from the restricted LC. MAC PDU 303 may be transmitted on the configured grant since at least one MAC sub-PDU contains the SDU from the permitted LC. In MAC PDU 304, the regular BSR is presented and the remaining space may be used to transmit the SDU from the restricted LC. The regular BSR may also have higher priority for transmission. MAC PDU 304 may be transmitted on the configured grant since at least one MAC sub-PDU contains the regular BSR.

MAC PDU 305 and MAC PDU 306 illustrate the example MAC PDUs that may not be allowed to transmit on the configured grant for the permitted logical channel. MAC PDU 305 only comprises the SDU from the restricted LC and the padding BSR. The SDU from the restricted LC is not allowed to use the configured grant. The padding BSR also has lower priority for transmission. MAC PDU 306 only comprises padding BSR and the padding. No critical data is comprised in MAC PDU 306 for triggering the transmission on the configured grant.

Illustrative Implementations

Figure 4:
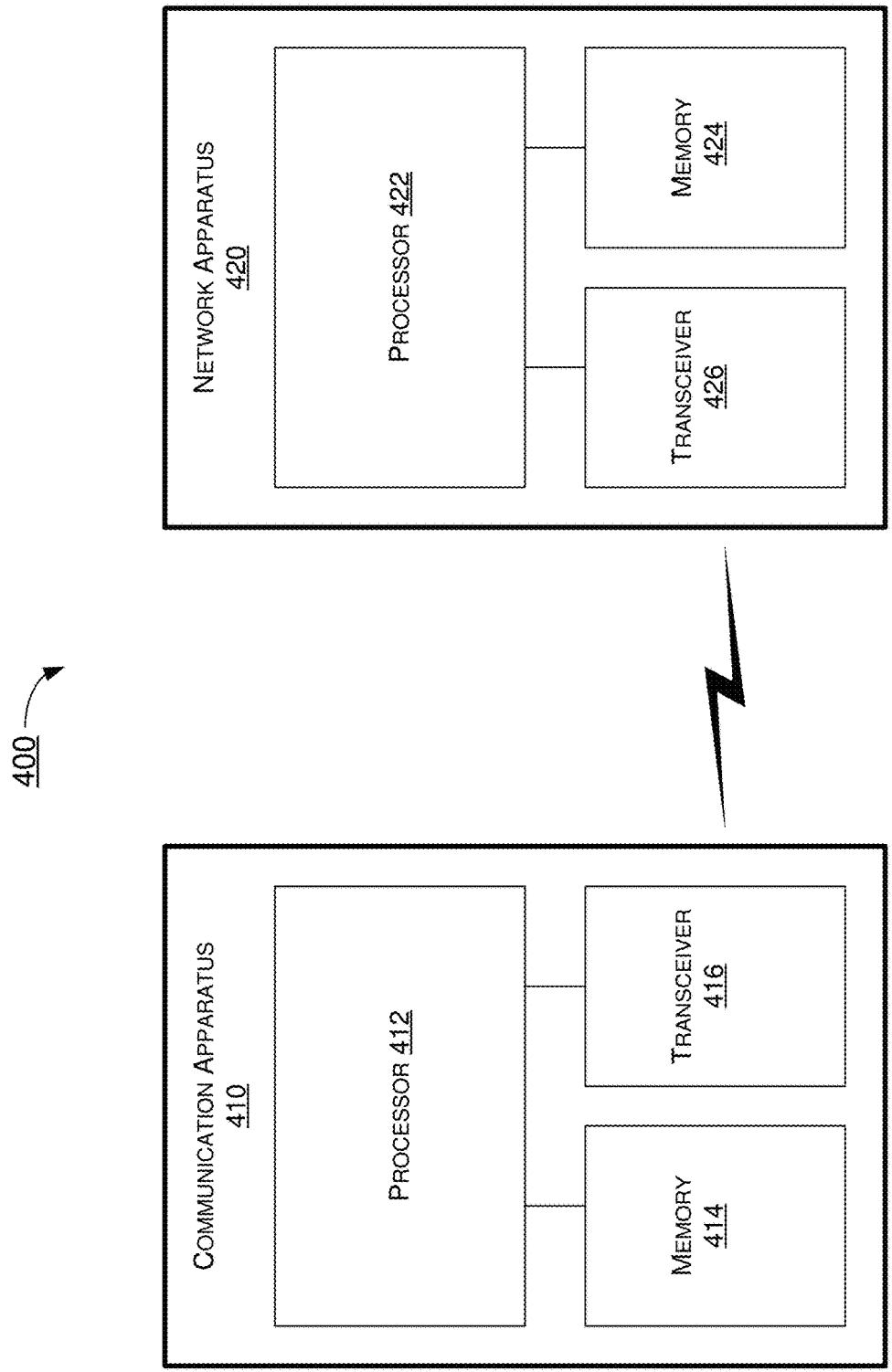
FIG. 4 is a block diagram of an example communication apparatus and an example network apparatus in accordance with an implementation of the present disclosure.

FIG. 4 illustrates an example communication apparatus 410 and an example network apparatus 420 in accordance with an implementation of the present disclosure. Each of communication apparatus 410 and network apparatus 420 may perform various functions to implement schemes, techniques, processes and methods described herein pertaining to transmission without dynamic scheduling with respect to user equipment and network apparatus in wireless communications, including scenarios 100 and 200 described above as well as process 500 described below.

Communication apparatus 410 may be a part of an electronic apparatus, which may be a UE such as a portable or mobile apparatus, a wearable apparatus, a wireless communication apparatus or a computing apparatus. For instance, communication apparatus 410 may be implemented in a smartphone, a smartwatch, a personal digital assistant, a digital camera, or a computing equipment such as a tablet computer, a laptop computer or a notebook computer. Communication apparatus 410 may also be a part of a machine type apparatus, which may be an IoT or NB-IoT apparatus such as an immobile or a stationary apparatus, a home apparatus, a wire communication apparatus or a computing apparatus. For instance, communication apparatus 410 may be implemented in a smart thermostat, a smart fridge, a smart door lock, a wireless speaker or a home control center. Alternatively, communication apparatus 410 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 410 may include at least some of those components shown in FIG. 4 such as a processor 412, for example. communication apparatus 410 may further include one or more other components not pertinent to the proposed scheme of the present disclosure (e.g., internal power supply, display device and/or user interface device), and, thus, such component(s) of communication apparatus 410 are neither shown in FIG. 4 nor described below in the interest of simplicity and brevity.

Network apparatus 420 may be a part of an electronic apparatus, which may be a network node such as a base station, a small cell, a router or a gateway. For instance, network apparatus 420 may be implemented in an eNodeB in an LTE, LTE-Advanced or LTE-Advanced Pro network or in a gNB in a 5G, NR, IoT or NB-IoT network. Alternatively, network apparatus 420 may be implemented in the form of one or more IC chips such as, for example and without limitation, one or more single-core processors, one or more multi-core processors, one or more RISC, or one or more CISC processors. Network apparatus 420 may include at least some of those components shown in FIG. 4 such as a processor 422, for example. Network apparatus 420 may further include one or more other components not pertinent to the proposed scheme of the present disclosure (e.g., internal power supply, display device and/or user interface device), and, thus, such component(s) of network apparatus 420 are neither shown in FIG. 4 nor described below in the interest of simplicity and brevity.

In one aspect, each of processor 412 and processor 422 may be implemented in the form of one or more single-core processors, one or more multi-core processors, one or more RISC, or one or more CISC processors. That is, even though a singular term "a processor" is used herein to refer to processor 412 and processor 422, each of processor 412 and processor 422 may include multiple processors in some implementations and a single processor in other implementations in accordance with the present disclosure. In another aspect, each of processor 412 and processor 422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 412 and processor 422 is a special-purpose machine specifically designed, arranged and configured to perform specific tasks including power consumption reduction in a device (e.g., as represented by communication apparatus 410) and a network (e.g., as represented by network apparatus 420) in accordance with various implementations of the present disclosure.

In some implementations, communication apparatus 410 may also include a transceiver 416 coupled to processor 412 and capable of wirelessly transmitting and receiving data. In some implementations, communication apparatus 410 may further include a memory 414 coupled to processor 412 and capable of being accessed by processor 412 and storing data therein. In some implementations, network apparatus 420 may also include a transceiver 426 coupled to processor 422 and capable of wirelessly transmitting and receiving data. In some implementations, network apparatus 420 may further include a memory 424 coupled to processor 422 and capable of being accessed by processor 422 and storing data therein. Accordingly, communication apparatus 410 and network apparatus 420 may wirelessly communicate with each other via transceiver 416 and transceiver 426, respectively. To aid better understanding, the following description of the operations, functionalities and capabilities of each of communication apparatus 410 and network apparatus 420 is provided in the context of a mobile communication environment in which communication apparatus 410 is implemented in or as a communication apparatus or a UE and network apparatus 420 is implemented in or as a network node of a communication network.

In some implementations, processor 412 may comprise a plurality of protocol layers such as, for example and without limitation, a RRC layer, a PDCP layer, a RLC layer, a MAC and a PHY layer. The PDCP layer may comprise a PDCP entity to receive data from the upper layer (e.g., RRC layer or application layer) via the DRBs. Processor 412 may comprise a RLC entity to receive data from the PDCP layer and transmit data to the MAC layer via LC. Processor 412 may comprise a MAC entity to schedule/multiplex data and transmit MAC PDUs to the physical layer.

In some implementations, processor 422 may be configured to transmit a configured grant to communication apparatus 410. Processor 422 may use the uplink grant to indicate uplink resources configured for communication apparatus 410 to perform uplink transmissions. The uplink grant may comprise the configured grant of grant-free based transmission and the dynamic grant of dynamic grant based transmission. The dynamic grant of dynamic grant based transmission is configured by processor 422 per communication apparatus 410's request. Processor 412 may have to transmit a request (e.g., SR, RACH request or BSR) to network apparatus 420 first. Processor 422 may configure a dynamic grant in response to the request. The configured grant is pre-configured by processor 422 without requiring a prior request. Processor 422 may pre-configure a configured grant to communication apparatus 410 for transmission without dynamic scheduling. Processor 412 may directly use the configured grant to transmit uplink data without request.

In some implementations, processor 412 may be configured to receive, via transceiver 416, the uplink grant via RRC signaling or L1 signaling. For example, the configured grant may comprise a first configured grant type (e.g., a configured grant type 1) which is provided by the RRC signaling. The configured grant may also comprise a second configured grant type (e.g., a configured grant type 2) which is provided by PDCCH signaling and may be activated or deactivated by L1 signaling indications.

In some implementations, processor 412 may be configured to classify data according to service requirements or characteristics of the data. Processor 412 may determine some data with a low latency QoS target as the critical data. Processor 412 may determine some data which is not reliant on real-time transmission as the non-critical data.

In some implementations, processor 412 may be configured to differentiate the data with different characteristics such as latency requirements or QoS requirements by different logical channels. For example, processor 412 may distribute the critical data to an allowed logical channel or a permitted logical channel. The data in the allowed logical channel or the permitted logical channel may be allowed to be transmitted via the configured grant transmission. Processor 412 may distribute the non-critical data may be distributed to a restricted logical channel. The data in the restricted logical channel may be not allowed to be transmitted via the configured grant transmission and may only be transmitted via the dynamic grant based transmission.

In some implementations, processor 412 may apply separate restrictions based on QoS flow. Processor 412 may be configured to differentiate the data with different characteristics by different QoS flow.

In some implementations, processor 422 may configure the logical channel restrictions via RRC signaling. Specifically, processor 422 may configure a logical channel restriction rule for each logical channel of communication apparatus 410. For example, processor 422 may configure an allowed indication (e.g., IcpconfiguredGrantType1Allowed) for a logical channel to indicate whether a logical channel is allowed to use the configured grant. In a case that the indication is set to be true, the logical channel is allowed to be selected for the configured grant transmission. In a case that the indication is set to be false, the logical channel is not allowed to be selected for the configured grant transmission. The allowed indication may be configured in a RRC signaling. Processor 412 may be configured to determine an allowed logical channel according to the logical channel restriction rule. Processor 412 may select a logical channel which an allowed indication is configured for the configured grant.

In some implementations, processor 412 may determine a first logical channel as a permitted logical channel and determine a second logical channel as a restricted logical channel. Processor 412 may configure the permitted logical channel to transmit the URLLC data. Processor 412 may configure the restricted logical channel to transmit the eMBB data. Processor 412 may receive the configured grant from network apparatus 420. The configured grant transmission occasions may be configured at some TTIs. The MAC entity may receive the uplink data from the permitted logical channel and the uplink data from the restricted logical channel. Processor 412 may schedule the uplink data from the permitted logical channel to a first MAC PDU. Processor 412 may be configured to transmit the first MAC PDU on the configured grant transmission occasion. The restricted logical channel is not allowed to be selected for the configured grant transmission. Processor 412 may pend or buffer the data from the restricted logical channel until receiving the dynamic grant.

In some implementations, processor 412 may further receive the dynamic grant of dynamic grant based transmission from network apparatus 420. The MAC entity may receive the uplink data from the permitted/allowed logical channel and the uplink data from the restricted logical channel. Processor 412 may schedule the uplink data from the permitted/allowed logical channel and the uplink data from the restricted logical channel to a second MAC PDU. Processor 412 may be configured to transmit the second MAC PDU on the dynamic grant transmission.

In some implementations, the permitted/allowed logical channels may be a subset of logical channels. Processor 422 may optionally configure a subset of logical channels that trigger communication apparatus 410 to perform uplink transmission on the configured grant by RRC signaling. Processor 422 may configure the subset of logical channels based on the corresponding service requirements (e.g., latency requirement).

In some implementations, processor 412 may schedule the uplink data from the permitted logical channel to a first MAC PDU. In a case that the first MAC PDU still has remaining space for filling data, processor 412 may further schedule the uplink data from the restricted logical channel to the first MAC PDU. Processor 412 may be configured to transmit the first MAC PDU on the configured grant transmission occasion.

In some implementations, processor 412 may further receive the dynamic grant of dynamic grant based transmission from network apparatus 420. Processor 412 may schedule the uplink data from the permitted logical channel and the uplink data from the restricted logical channel to a second MAC PDU. Processor 412 may be configured to transmit the second MAC PDU on the dynamic grant transmission.

In some implementations, the MAC entity may receive the uplink data from the restricted logical channel. Since only the permitted logical channel is allowed for the configured grant transmission, the uplink data from the restricted logical channel may not trigger the transmission on the configured grant transmission occasion. Processor 412 may not perform uplink transmission. Processor 412 may be configure to transmit a request to acquire the dynamic grant of dynamic grant based transmission. Processor 412 may then receive the dynamic grant of dynamic grant based transmission from network apparatus 420. Processor 412 may schedule the uplink data from the restricted logical channel to a third MAC PDU. Processor 412 may be configured to transmit the third MAC PDU on the dynamic grant transmission.

In some implementations, in a case that a MAC PDU comprises the SDU from the permitted/allowed logical channel and/or the MAC CE, processor 412 may be configured to transmit the MAC PDU on the configured grant. In a case that a MAC PDU comprises the MAC CE and the SDU from the restricted logical channel, processor 412 may be also configured to transmit the MAC PDU on the configured grant.

In some implementations, in a case that the configuration for permitted logical channels is not received from network apparatus 420, processor 412 may consider all logical channels to be permitted for using the configured grant. Alternatively, processor 412 may be configured to determine some logical channels as the permitted logical channels according to a previous configuration or a pre-determined rue.

Illustrative Processes

Figure 5:
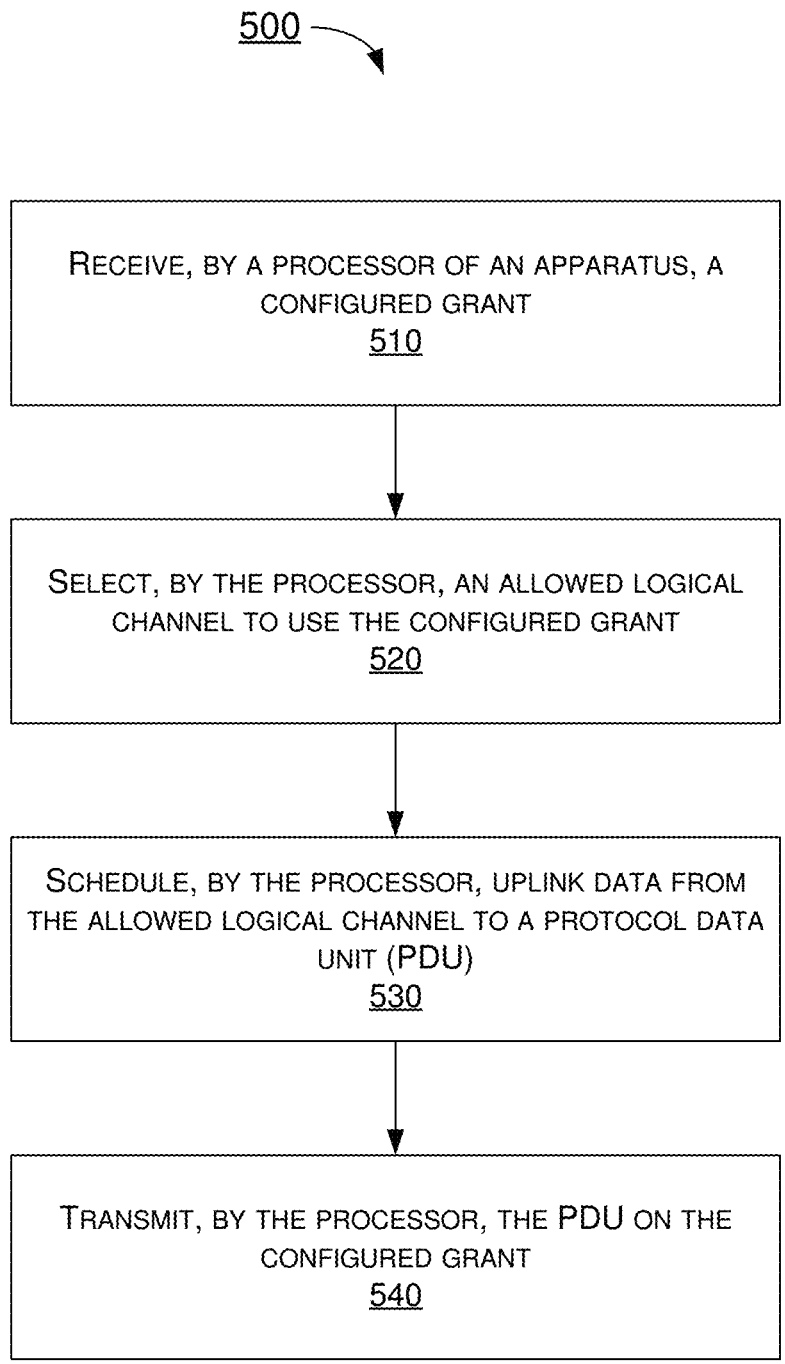
FIG. 5 is a flowchart of an example process in accordance with an implementation of the present disclosure.

FIG. 5 illustrates an example process 500 in accordance with an implementation of the present disclosure. Process 500 may be an example implementation of scenarios 100 and 200, whether partially or completely, with respect to transmission without dynamic scheduling in accordance with the present disclosure. Process 500 may represent an aspect of implementation of features of communication apparatus 410. Process 500 may include one or more operations, actions, or functions as illustrated by one or more of blocks 510, 520, 530 and 540. Although illustrated as discrete blocks, various blocks of process 500 may be divided into additional blocks, combined into fewer blocks, or eliminated, depending on the desired implementation. Moreover, the blocks of process 500 may executed in the order shown in FIG. 5 or, alternatively, in a different order. Process 500 may be implemented by communication apparatus 410 or any suitable UE or machine type devices. Solely for illustrative purposes and without limitation, process 500 is described below in the context of communication apparatus 410. Process 500 may begin at block 510.

At 510, process 500 may involve processor 412 of apparatus 410 receiving a configured grant. Process 500 may proceed from 510 to 520.

At 520, process 500 may involve processor 412 determining an allowed logical channel to use the configured grant. Process 500 may proceed from 520 to 530.

At 530, process 500 may involve processor 412 scheduling uplink data from the allowed logical channel to a protocol data unit (PDU). Process 500 may proceed from 530 to 540.

At 540, process 500 may involve processor 412 transmitting the PDU on the configured grant.

In some implementations, the configured grant may indicate uplink resources configured for contention based grant-free transmissions.

In some implementations, process 500 may involve processor 412 receiving the configured grant via RRC signaling or L1 signaling.

In some implementations, process 500 may involve processor 412 determining the allowed logical channel according to a logical channel restriction rule.

In some implementations, process 500 may involve processor 412 selecting a logical channel which an allowed indication is configured. The allowed indication may be configured in RRC signaling.

In some implementations, the allowed logical channel may be configured to transmit URLLC data.

In some implementations, process 500 may involve processor 412 receiving a dynamic grant. Process 500 may involve processor 412 determining a restricted logical channel. Process 500 may involve processor 412 scheduling uplink data from the restricted logical channel to a second PDU. Process 500 may involve processor 412 transmitting the second PDU on the dynamic grant.

In some implementations, the restricted logical channel may be configured to transmit eMBB data.

In some implementations, process 500 may involve processor 412 determining a restricted logical channel. Process 500 may involve processor 412 scheduling uplink data from the restricted logical channel to a remaining part of the first PDU. Process 500 may involve processor 412 transmitting the PDU on the configured grant.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  receiving, by a processor of an apparatus, a configured grant from a New Radio (NR) mobile network;
  selecting, by the processor, an allowed logical channel to use the configured grant;
  scheduling, by the processor, uplink data from the allowed logical channel to a first protocol data unit (PDU); and
  transmitting, by the processor, the first PDU on the configured grant to the 5G mobile network.

2. The method of claim 1, wherein the configured grant indicates uplink resources configured for contention based grant-free transmissions.

3. The method of claim 1, wherein the receiving comprises receiving the configured grant via radio resource control (RRC) signaling or layer 1 (L1) signaling.

4. The method of claim 1, wherein the determining comprises determining the allowed logical channel according to a logical channel restriction rule.

5. The method of claim 1, wherein the determining comprises selecting a logical channel for which an allowed indication is configured.

6. The method of claim 5, wherein the allowed indication is configured in a RRC signaling.

7. The method of claim 1, wherein the allowed logical channel is configured to transmit ultra-reliable and low latency communications (URLLC) data.

8. The method of claim 1, further comprising:
receiving, by the processor, a dynamic grant;
determining, by the processor, a restricted logical channel;
scheduling, by the processor, uplink data from the restricted logical channel to a second PDU; and
transmitting, by the processor, the second PDU on the dynamic grant.

9. The method of claim 8, wherein the restricted logical channel is configured to transmit enhanced mobile broadband (eMBB) data.

10. The method of claim 1, further comprising:
determining, by the processor, a restricted logical channel;
scheduling, by the processor, uplink data from the restricted logical channel to a remaining part of the first PDU; and
transmitting, by the processor, the first PDU on the configured grant.

11. An apparatus, comprising:
a transceiver capable of wirelessly communicating with a plurality of nodes of a wireless network which is a New Radio (NR) mobile network; and
a processor communicatively coupled to the transceiver, the processor capable of:
receiving, via the transceiver, a configured grant of grant-free transmission from the wireless network;
selecting an allowed logical channel to use the configured grant;
scheduling uplink data from the allowed logical channel to a first protocol data unit (PDU); and
transmitting, via the transceiver, the first PDU on the configured grant to the wireless network.

12. The apparatus of claim 11, wherein the configured grant indicates uplink resources configured for contention based grant-free transmissions.

13. The apparatus of claim 11, wherein, in receiving the configured grant, the processor receives the uplink grant via radio resource control (RRC) signaling or layer 1 (L1) signaling.

14. The apparatus of claim 11, wherein, in determining the allowed logical channel, the processor determines the allowed logical channel according to a logical channel restriction rule.

15. The apparatus of claim 11, wherein, in determining the allowed logical channel, the processor selects a logical channel for which an allowed indication is configured.

16. The apparatus of claim 15, wherein the allowed indication is configured in a RRC signaling.

17. The apparatus of claim 11, wherein the allowed logical channel is configured to transmit ultra-reliable and low latency communications (URLLC) data.

18. The apparatus of claim 11, wherein the processor is further capable of:
receiving, via the transceiver, a dynamic grant;
determining a restricted logical channel;
scheduling uplink data from the restricted logical channel to a second PDU; and
transmitting, via the transceiver, the second PDU on the dynamic grant.

19. The apparatus of claim 18, wherein the restricted logical channel is configured to transmit enhanced mobile broadband (eMBB) data.

20. The apparatus of claim 11, wherein the processor is further capable of:
determining a restricted logical channel;
scheduling uplink data from the restricted logical channel to a remaining part of the first PDU; and
transmitting, via the transceiver, the first PDU on the configured grant.

* * * * *